(12) United States Patent
Liu et al.

(10) Patent No.: US 11,970,125 B2
(45) Date of Patent: Apr. 30, 2024

(54) SEAT MISUSE ALARM DEVICE

(71) Applicant: BAMBINO PREZIOSO SWITZERLAND AG, Steinhausen (CH)

(72) Inventors: Zu Jian Liu, Guangdong (CN); Zhengwen Guo, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/908,187

(22) PCT Filed: Mar. 3, 2021

(86) PCT No.: PCT/EP2021/055262
§ 371 (c)(1),
(2) Date: Aug. 30, 2022

(87) PCT Pub. No.: WO2021/175892
PCT Pub. Date: Sep. 10, 2021

(65) Prior Publication Data
US 2023/0117168 A1   Apr. 20, 2023

(30) Foreign Application Priority Data
Mar. 3, 2020   (CN) .......................... 202010141341.6

(51) Int. Cl.
*B60R 21/015*   (2006.01)
*B60N 2/28*   (2006.01)
*B60N 2/809*   (2018.01)

(52) U.S. Cl.
CPC ...... *B60R 21/01554* (2014.10); *B60N 2/2821* (2013.01); *B60N 2/2851* (2013.01); *B60N 2/2869* (2013.01); *B60N 2/809* (2018.02)

(58) Field of Classification Search
CPC ............ B60R 21/01554; B60N 2/2821; B60N 2/2851; B60N 2/2869; B60N 2/809
See application file for complete search history.

(56) References Cited

U.S. PATENT DOCUMENTS

| 4,936,629 A | 6/1990 | Young | |
| 5,260,684 A * | 11/1993 | Metzmaker | ............ B60N 2/286 340/440 |

(Continued)

FOREIGN PATENT DOCUMENTS

| CN | 101391583 A | 3/2009 |
| CN | 101391583 B | 1/2011 |

(Continued)

OTHER PUBLICATIONS

PCT Notification of Transmittal of the International Search Report and the Written Opinion of the International Searching Authority, or the Declaration; International Application No. PCT/EP2021/055262; International Filing Date: Mar. 3, 2021; dated May 17, 2021; pp. 1-10.

(Continued)

*Primary Examiner* — Mohamed Barakat
(74) *Attorney, Agent, or Firm* — CANTOR COLBURN LLP

(57) ABSTRACT

The present invention discloses a seat misuse alarm device (100). The seat misuse alarm device (100) includes a base (1), a seat (2), an alarm mechanism (3), and a switch triggering device (4). The seat (2) has a forward facing position and a rearward facing position relative the base (1). The alarm mechanism (3) has a switch (31). The switch triggering device (4) triggers the switch (31) to close for making the alarm mechanism (3) send out an alarm when the seat (2) is located at the forward facing position relative to the base (1).

16 Claims, 12 Drawing Sheets

(56) References Cited

U.S. PATENT DOCUMENTS

| | | | |
|---|---|---|---|
| 10,157,534 B2 * | 12/2018 | Pham | H04W 4/14 |
| 2002/0158453 A1 * | 10/2002 | Levine | B60K 23/02 |
| | | | 280/735 |
| 2008/0054694 A1 * | 3/2008 | Lhomme | B60N 2/2821 |
| | | | 297/256.12 |
| 2009/0027188 A1 * | 1/2009 | Saban | B60N 2/002 |
| | | | 340/439 |
| 2009/0184549 A1 | 7/2009 | Kassai et al. | |
| 2012/0232749 A1 * | 9/2012 | Schoenberg | B60R 21/01526 |
| | | | 340/457 |
| 2020/0010040 A1 | 1/2020 | Nakamura et al. | |
| 2022/0396184 A1 * | 12/2022 | Guo | B60N 2/2821 |

FOREIGN PATENT DOCUMENTS

| | | |
|---|---|---|
| CN | 102092319 A | 6/2011 |
| CN | 107031559 A | 8/2017 |
| CN | 110126687 A | 8/2019 |
| CN | 209833421 U | 12/2019 |
| DE | 19949933 C1 | 2/2001 |
| FR | 2978388 A1 | 2/2013 |
| JP | 2010269702 A | 12/2010 |
| WO | 2006094758 A1 | 9/2006 |
| WO | 2012014559 A1 | 2/2012 |
| WO | 2018050576 A1 | 3/2018 |
| WO | 2018139052 A1 | 8/2018 |
| WO | 2018167919 A1 | 9/2018 |
| WO | 2018197215 A1 | 11/2018 |
| WO | 2018235700 A1 | 12/2018 |

OTHER PUBLICATIONS

AU Examination Report No. 2 for Standard Patent Application; Application No. 2021231211; Date Mailed: Feb. 19, 2024; pp. 1-6.

* cited by examiner

SEAT MISUSE ALARM DEVICE

CROSS REFERENCE TO RELATED APPLICATIONS

This application is a National Stage application of PCT/EP2021/055262, filed Mar. 3, 2021, which claims the benefit of Chinese Application No. 202010141341.6, filed Mar. 3, 2020, both of which are incorporated by reference in their entirety herein.

FIELD OF THE INVENTION

The present invention relates to a seat misuse alarm device according to the pre-characterizing clause of claim 1.

BACKGROUND OF THE INVENTION

A child safety seat is designed for ensuring safety of a child in a car. In general, the child safety seat is assembled in the car to allow the child sitting thereon for constraining the child in the car, so as to ensure safety of the child. A conventional child safety seat usually includes a base and a seat rotatably disposed on the base. The seat has a forward facing position and a rearward facing position relative to the base, so that a user can adjust the seat to a desired position according to the practical needs. For safety issues, it is forbidden that the user adjusts the seat to the forward facing position and then put a child from 0 to 15 months on the seat. However, since the child safety seat does not have a seat misuse alarm function, the user often puts a child from 0 to 15 months on the seat at the forward facing position by mistake. Thus, it may cause a great risk to safety of a child in a car.

Therefore, it is necessary to design a seat misuse alarm device for solving the aforesaid problem.

SUMMARY OF THE INVENTION

The present invention aims at providing a seat misuse alarm device for sending out an alarm when a seat is misused.

This is achieved by a seat misuse alarm device according to claim 1. The dependent claims pertain to corresponding further developments and improvements.

As will be seen more clearly from the detailed description following below, the claimed seat misuse alarm device of the present invention includes a base, a seat, an alarm mechanism, and a switch triggering device. The seat has a forward facing position and a rearward facing position relative the base. The alarm mechanism has a switch. The switch triggering device triggers the switch to close for making the alarm mechanism send out an alarm when the seat is located at the forward facing position relative to the base.

Preferably, the seat is rotatably connected to the base. Preferably, the alarm mechanism is disposed on one of the base and the seat, and the switch triggering device is disposed on the other of the base and the seat.

Preferably, the alarm mechanism is disposed on the base, and the switch triggering device is disposed on the seat.

Preferably, a first hole is formed at a side of the base, the switch is located in the first hole, a second hole is formed at a side of the seat, the switch triggering device is disposed through the second hole, and with rotation of the seat to the forward facing position relative to the base, the first hole is aligned with the second hole to make an end of the switch triggering device extend into the first hole and then trigger the switch to close.

Preferably, the switch triggering device includes a driving member and an elastic returning member, the driving member is slidably disposed in the second hole, and the elastic returning member is disposed between the driving member and the seat for providing an elastic force to make the driving member ejected from the second hole.

Preferably, a first limiting portion is formed on an inner wall of the second hole, a protrusion is formed on the driving member, and the elastic returning member is disposed between the first limiting portion and the protrusion.

Preferably, a fixing base is fixed to the inner wall of the second hole, and the first limiting portion protrudes from the fixing base.

Preferably, a second limiting portion is formed on the fixing base and is spaced apart from the first limiting portion, and the protrusion is located between the first limiting portion and the second limiting portion.

Preferably, the elastic returning member jackets the driving member.

Preferably, the alarm mechanism includes a control device and an alarm device, the switch, the control device, and the alarm device are electrically connected to each other and cooperatively form an alarm circuit, and when the switch is triggered to close, the control device controls the alarm device to send out the alarm.

Preferably, after an alarm time of the alarm device reaches to a predetermined value, the control device controls the alarm device to stop sending out the alarm.

Preferably, the seat misuse alarm device further includes a headrest mechanism. The headrest mechanism is movably disposed on the seat and electrically connected to the alarm mechanism. When the seat is located at the forward facing position relative to the base for triggering the switch to close, a height of the headrest mechanism relative to the seat determines whether to conduct the alarm mechanism for making the alarm mechanism selectively send out the alarm.

Preferably, the headrest mechanism includes a headrest, a headrest fixing base, and a headrest triggering switch, the headrest is slidably disposed on a front side of the seat to be slidable between a higher position and a lower position relative to the seat, the headrest passes through the seat to be connected to the headrest fixing base located on a back side of the seat for making the headrest fixing base slidable together with the headrest, the headrest triggering switch is disposed on the back side of the seat and is electrically connected to the alarm mechanism, and the alarm mechanism sends out the alarm when the headrest slides to the lower position relative to the seat to make the headrest fixing base trigger the headrest triggering switch to close and the seat is located at the forward facing position relative to the base to trigger the switch to close.

Preferably, the headrest fixing base has a driving rib protruding therefrom corresponding to the headrest triggering switch, and the driving rib presses the headrest triggering switch to close when the headrest slides to the lower position relative to the seat.

Preferably, when the headrest slides away from the lower position relative to the seat to make the headrest fixing base not trigger the headrest triggering switch to close, the alarm device does not send out the alarm.

Preferably, the headrest mechanism includes a headrest, the headrest is slidably disposed on a front side of the seat to be slidable between a higher position and a lower position, the headrest is electrically connected to the alarm mechanism for cooperatively forming an alarm circuit, and the headrest breaks the alarm circuit to make the alarm device not send out the alarm when the headrest slides to the higher position relative to the seat.

Compared with the prior art, the present invention adopts the design that the switch triggering device is aligned with the switch of the alarm mechanism for triggering the switch to close when the seat is located at the forward facing position relative to the base. In such a manner, the alarm mechanism can send out an alarm to remind a user not to put a child from 0 to 15 months on the seat at the forward facing position. Thus, the present invention can improve operational safety in use of a child safety seat.

BRIEF DESCRIPTION OF THE DRAWINGS

In the following, the invention is further illustrated by way of example, taking reference to the accompanying drawings thereof.

DETAILED DESCRIPTION

The embodiments of the present invention will now be described with reference to the accompanying drawings.

Figure 1:
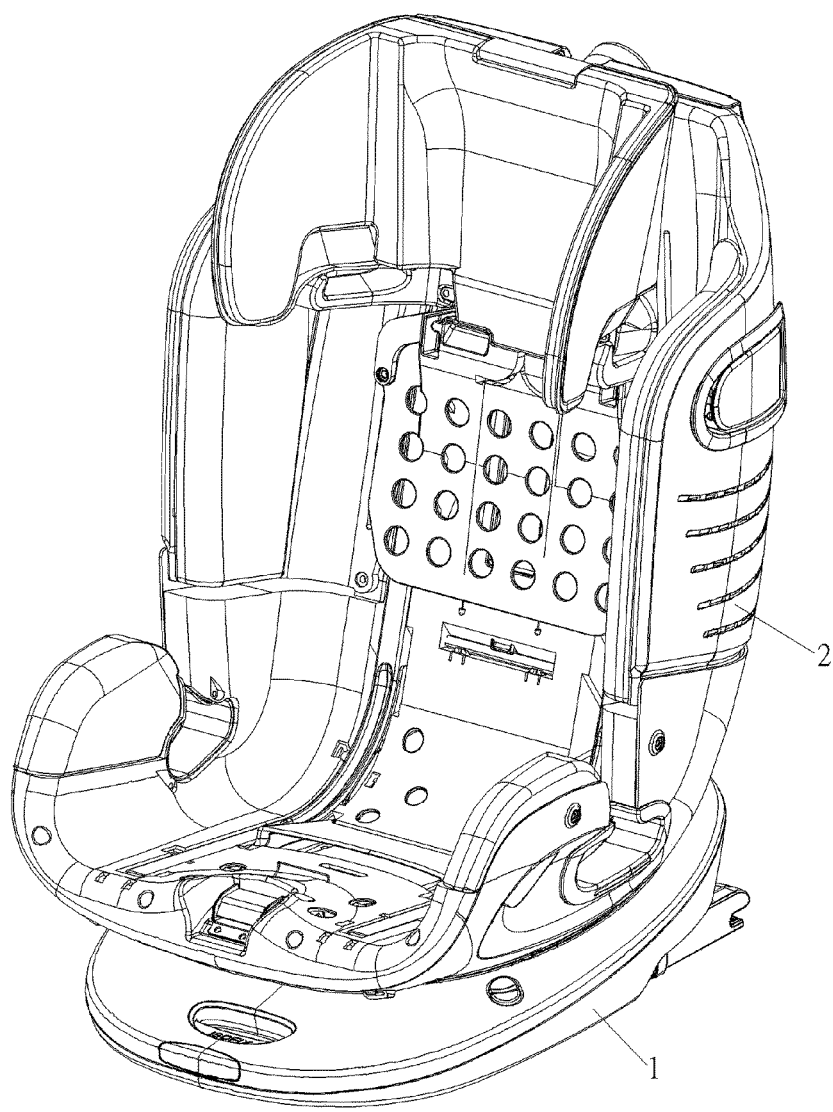
FIG. 1 is a diagram of a seat misuse alarm device of the present invention.
Figure 7:
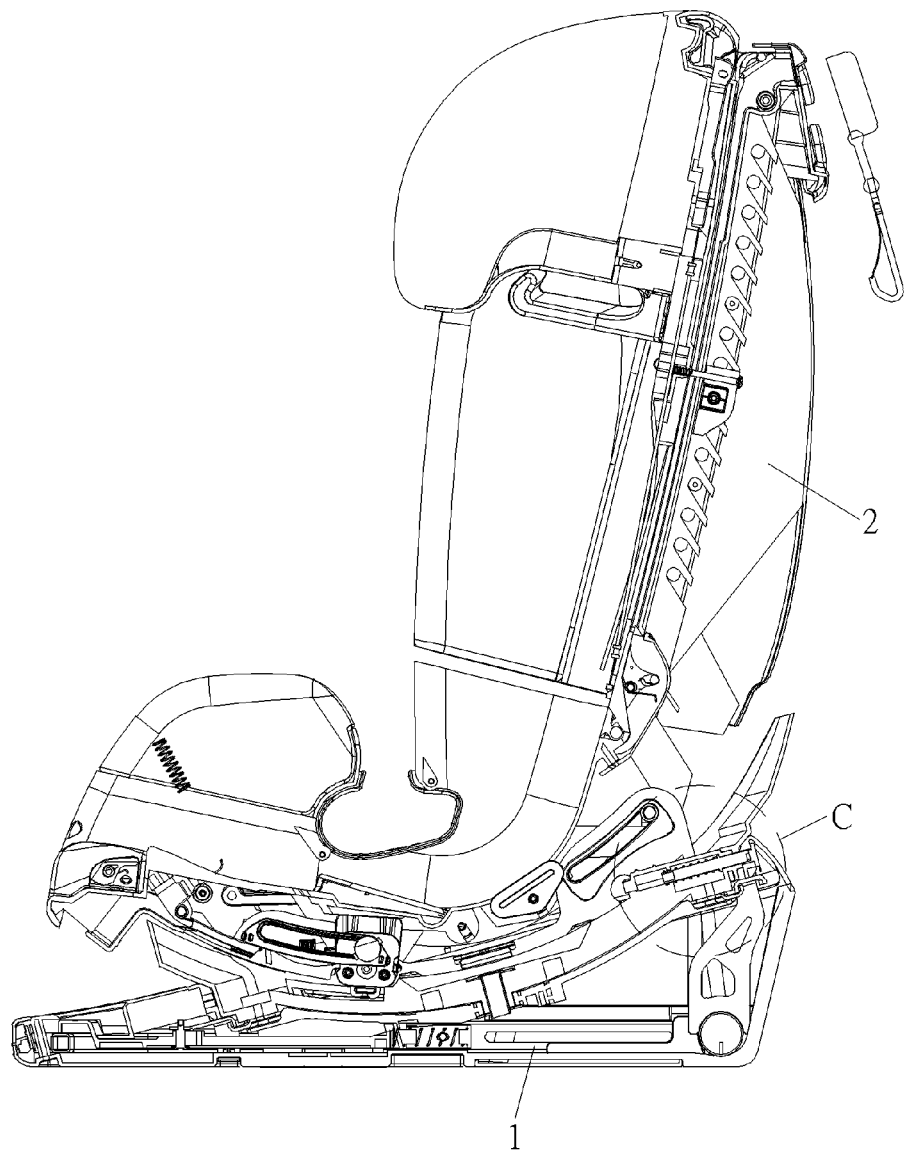
FIG. 7 is a cross-sectional diagram of the seat misuse alarm device of the present invention.
Figure 8:
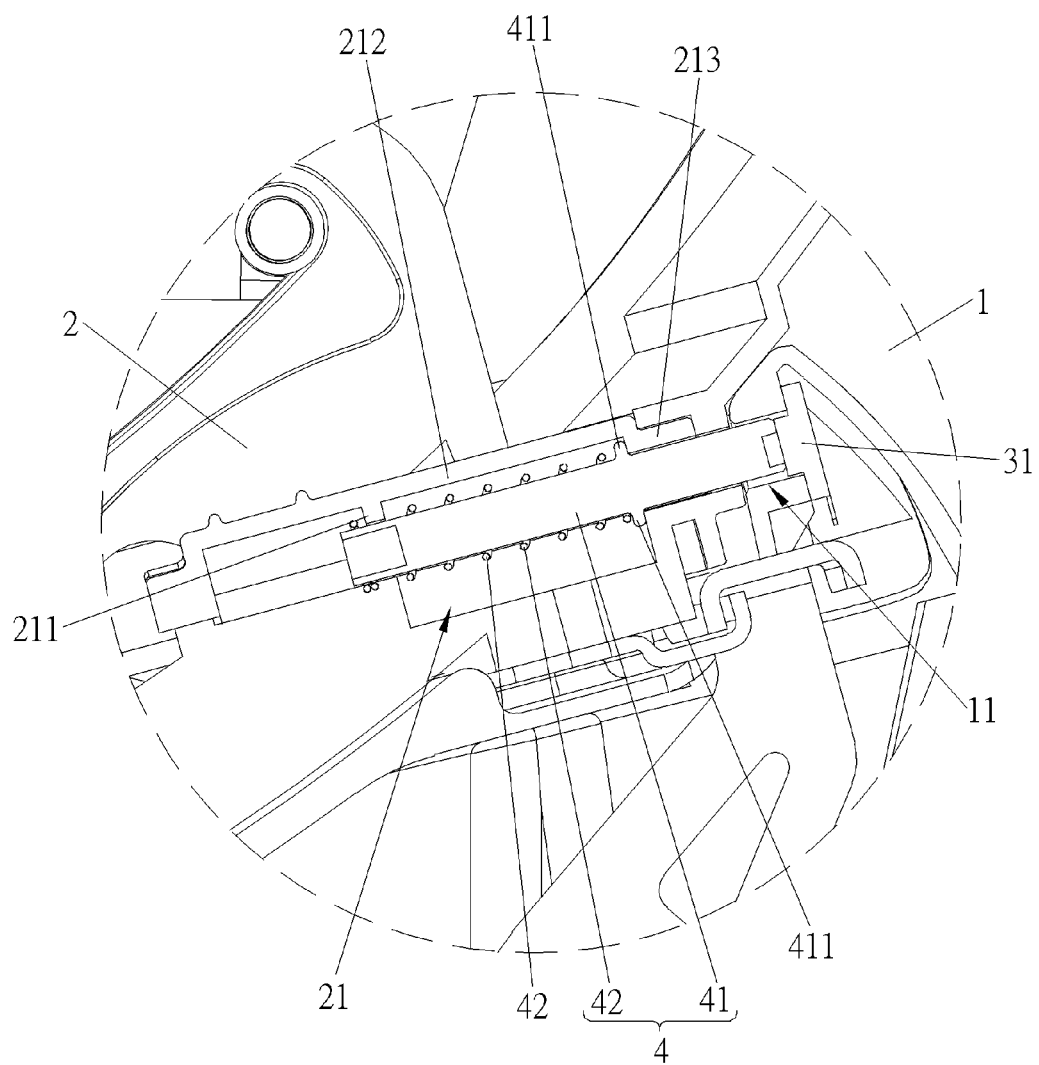
FIG. 8 is an enlarged diagram of "C" region in FIG. 7.

Please refer to FIG. 1, FIG. 7, and FIG. 8. A seat misuse alarm device 100 of the present invention includes a base 1, a seat 2, an alarm mechanism 3, and a switch triggering device 4. The seat 2 has a forward facing position and a rearward facing position relative to the base 1. Specifically, the seat 2 is rotatably connected to the base 1. As such, the seat 2 can be adjusted to the forward facing position or the rearward facing position via rotation of the seat 2 relative to the base 1, but the present invention is not limited thereto. For example, the seat 2 could be detachably connected to the base 1. In such a manner, the seat 2 could be detached from the base 1, moved to the forward facing position or the rearward facing position, and then reassembled with the base 1. The alarm mechanism 3 is disposed on one of the base 1 and the seat 2, and the switch triggering device 4 is disposed on the other of the base 1 and the seat 2. The alarm mechanism 3 has a switch 31. When the seat 2 rotates to the forward facing position relative to the base 1, the switch triggering device 4 triggers the switch 31 to close, so as to make the alarm mechanism 3 send out an alarm. In this embodiment, the alarm mechanism 3 is disposed on the base 1, and the switch triggering device 4 is disposed on the seat 2. With rotation of the seat 2 to the forward facing position relative to the base 1, the switch triggering device 4 rotates to be aligned with the switch 31 of the alarm mechanism 3 and then trigger the switch 31 to close for making the alarm mechanism 3 send out the alarm, so as to remind a user not to put a child from 0 to 15 months on the seat 2 located at the forward facing position. In another embodiment, the alarm mechanism 3 could be disposed on the seat 2 and the switch triggering device 4 could be disposed on the base 1 for achieving the same alarm effect.

Figure 2:
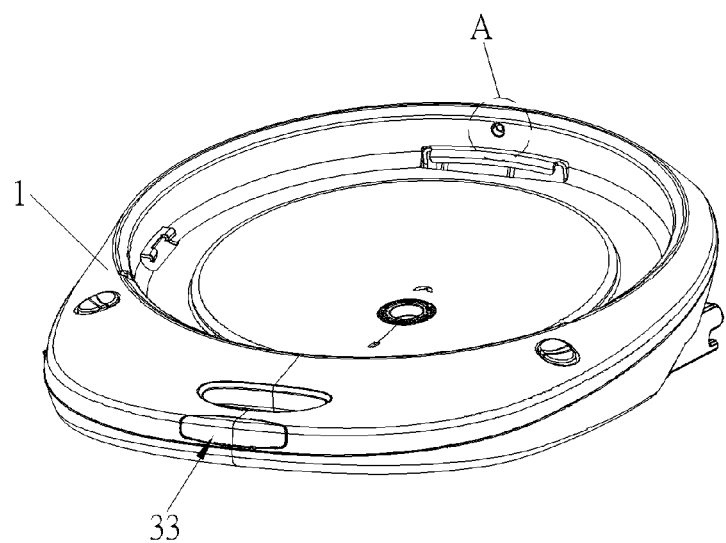
FIG. 2 is an enlarged diagram of a base of the seat misuse alarm device of the present invention.
Figure 3:
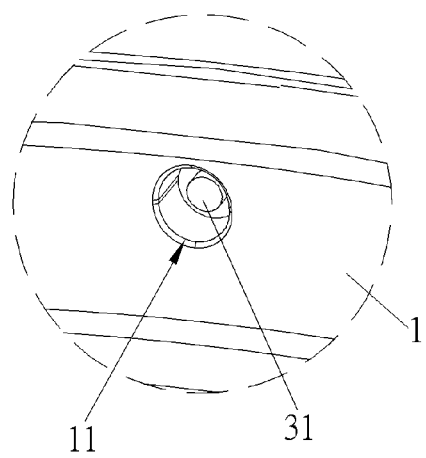
FIG. 3 is an enlarged diagram of "A" region in FIG. 2.

Please refer to FIG. 2, FIG. 3, and FIG. 8. A first hole 11 is formed at a side of the base 1, and the switch 31 is disposed in the first hole 11. A second hole 21 is formed at a side of the seat 2, and the switch triggering device 4 is disposed through the second hole 21. With rotation of the seat 2 to the forward facing position relative to the base 1, the first hole 11 is aligned with the second hole 21 to make an end of the switch triggering device 4 extend into the first hole 11 and then trigger the switch 31 to close.

Please refer to FIG. 5-8. In this embodiment, the switch triggering device 4 includes a driving member 41 and an elastic returning member 42. The driving member 41 is slidably disposed in the second hole 21. The elastic returning member 42 is disposed between the driving member 41 and the seat 2 for providing an elastic force to make the driving member 41 ejected out of the second hole 21. The elastic returning member 42 could be a conventional compression spring commonly seen in the prior art. When the seat 2 is located at the rearward facing position relative to the base 1, a side wall of the base 1 presses the driving member 41 into the second hole 21, so as to make the elastic returning member 42 compressed by the driving member 41. When the seat 2 rotates to the forward facing position relative to the base 1, the first hole 11 is aligned with the second hole 21, and the elastic force of the elastic returning member 42 drives an end of the driving member 41 to be ejected out of the second hole 21 and then extend into the first hole 11 of the base 1 since the driving member 41 is no longer pressed by the side wall of the base 1, so that the driving member 41 can trigger the switch 31 to close for making the alarm mechanism 3 send out the alarm. To be noted, the design of the switch triggering device 4 is not limited to the aforesaid embodiment, meaning that the present invention could adopt the design that the switch triggering device is an elastic deformable member in another embodiment. Specifically, a first limiting portion 211 is formed on an inner wall of the second hole 21, and a protrusion 411 is formed on the driving member 41. The protrusion 411 is formed on a middle portion of the driving member 41, and the elastic returning member 42 is disposed between the first limiting portion 211 and the protrusion 411. To be more specific, a fixing base 212 is fixed to the inner wall of the second hole 21, and the first limiting portion 211 protrudes from the fixing base 212, and the elastic returning member 42 jackets the driving member 41. The design of the first limiting portion 211 is not limited to the aforesaid embodiment. For example, the present invention could adopt the design that the first limiting portion 211 directly protrudes from the inner wall of the second hole 21. Furthermore, a second limiting portion 213 protrudes from the fixing base 212 and is spaced apart from the first limiting portion 211, and the protrusion 411 is located between the first limiting portion 211 and the second limiting portion 213. As such, the driving member 41 can be partially constrained in the second hole 21 by the second limiting portion 213 limiting the protrusion 411 of the driving member 41, so as to prevent complete ejection of the driving member 41 out of the second hole 21 via the elastic force provided by the elastic returning member 42.

Figure 4:
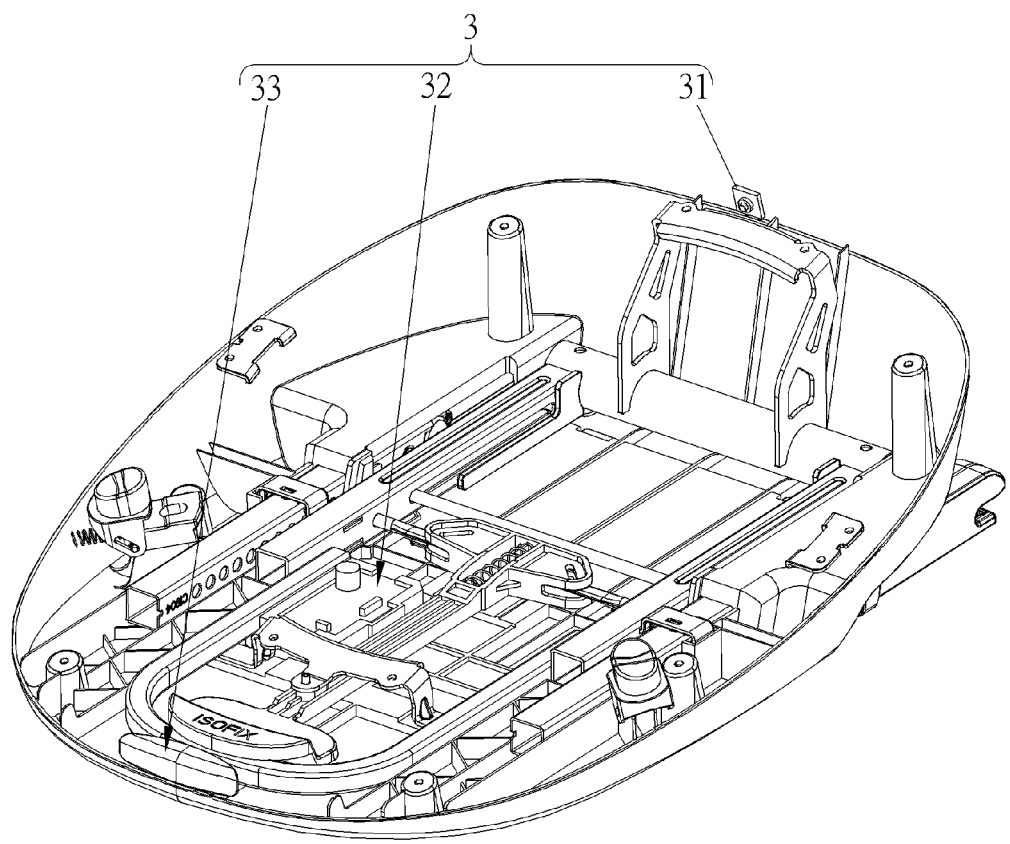
FIG. 4 is an internal diagram of the base of the seat misuse alarm device after an upper cover is omitted.
Figure 5:
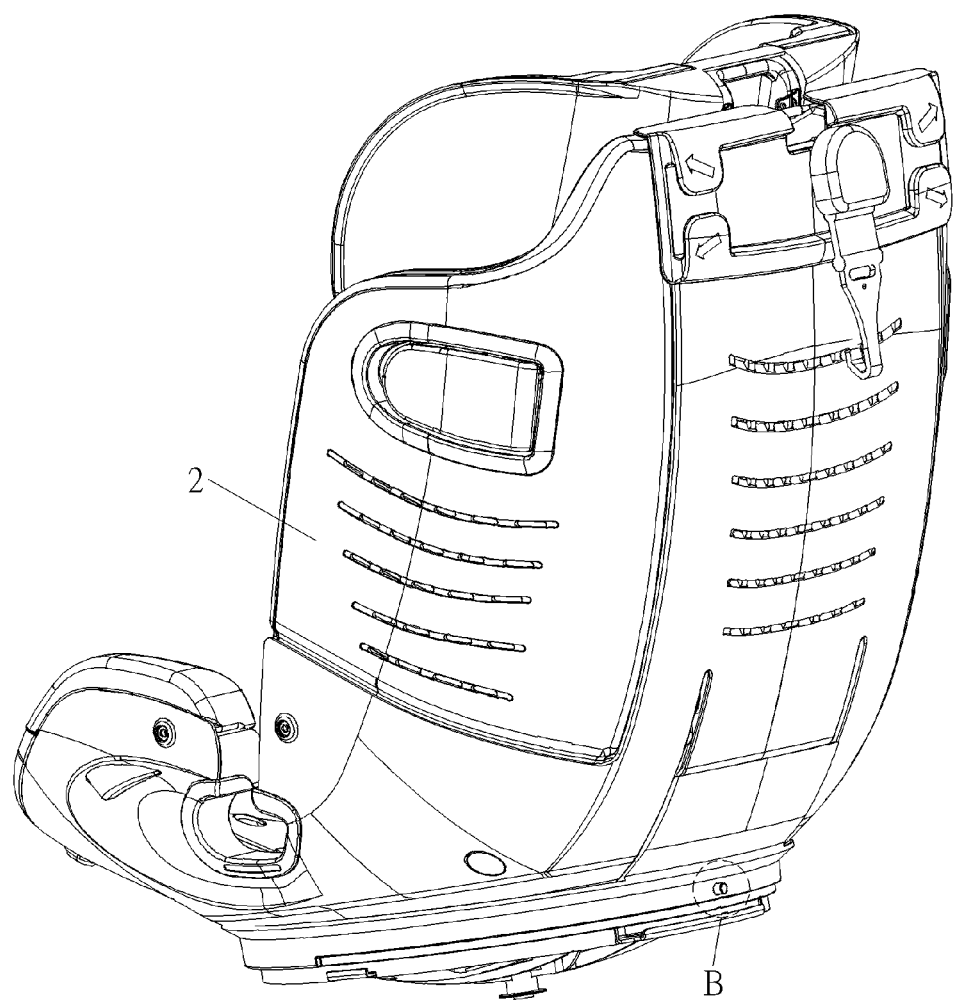
FIG. 5 is a diagram of a seat of the seat misuse alarm device of the present invention.
Figure 6:
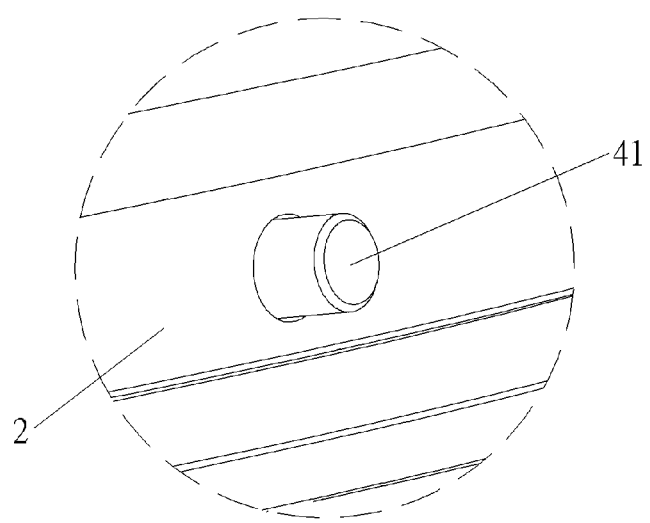
FIG. 6 is an enlarged diagram of "B" region in FIG. 5.

Please refer to FIG. 2 and FIG. 4. In this embodiment, the alarm mechanism 3 includes a control device 32 and an alarm device 33. The switch 31, the control device 32, and the alarm device 33 are electrically connected to each other and cooperatively form an alarm circuit. When the switch 31 is triggered to close, the control device 32 controls the alarm device 33 to send out the alarm. Specifically, the control device 32 is disposed in the base 1 and located at a middle portion of the base 1, the alarm device 33 is located at an outer front end of the base 1, and the switch 31 is electrically connected to the control device 32 and the alarm device 33 via wires. A power source is disposed in the control device 32. The related description for the control device 32 and the alarm device 33 is omitted since it is commonly seen in the prior art. Furthermore, after an alarm time of the alarm device 33 reaches to a predetermined value, the control device 32 controls the alarm device 33 to stop sending out the alarm. For example, the predetermined value could be set as two, three, or four seconds, but not limited thereto. In such a manner, when the seat 2 rotates to the forward facing position relative to the base 1 and the driving member 41 triggers the switch 31 to close for conducting the alarm circuit, the control device 32 controls the alarm device 33 to send out the alarm. After the alarm time of the alarm device 33 reaches to the predetermined value, the control device 32 controls the alarm device 33 to stop sending out the alarm until next time that the driving member 41 triggers the switch 31 again.

The detailed description for the operations of the seat misuse alarm device 100 is provided as follows according to FIGS. 1-8.

When the seat 2 is located at the rearward facing position relative to the base 1, the first hole 11 is misaligned with the second hole 21, and the side wall of the base 1 presses the driving member 41 into the second hole 21 to make the elastic returning member 42 compressed by the driving member 41. At this time, the switch 31 is in an open state, and the alarm device 33 does not send out the alarm. When the seat 2 rotates to the forward facing position relative to the base 1, the first hole 11 is aligned with the second hole 21, and the elastic force of the elastic returning member 42 drives the end of the driving member 41 to be ejected out of the second hole 21 and then extend into the first hole 11 of the base 1 since the driving member 41 is no longer pressed by the side wall of the base 1, so that the driving member 41 can trigger the switch 31 to close for conducting the alarm circuit. At this time, the control device 32 controls the alarm device 33 to send out the alarm for reminding the user not to put a child from 0 to 15 months on the seat 2 located at the forward facing position. After the alarm time of the alarm device 33 reaches to the predetermined value, the control device 32 controls the alarm device to stop sending out the alarm until next time that the driving member 41 triggers the switch 31 again.

In summary, the present invention adopts the design that the alarm device 3 is disposed on one of the base 1 and the seat 2 and the switch triggering device 4 is disposed on the other of the base 1 and the seat 2. With rotation of the seat 2 to the forward facing position relative to the base 1, the switch triggering device 4 rotates to be aligned with the switch 31 of the alarm mechanism 3, and then triggers the switch 31 to close for making the alarm mechanism 3 send out the alarm, so as to remind the user not to put a child from 0 to 15 months on the seat 2 located at the forward facing position. In such a manner, the present invention improves operational safety in use of a child safety seat.

Figure 9:
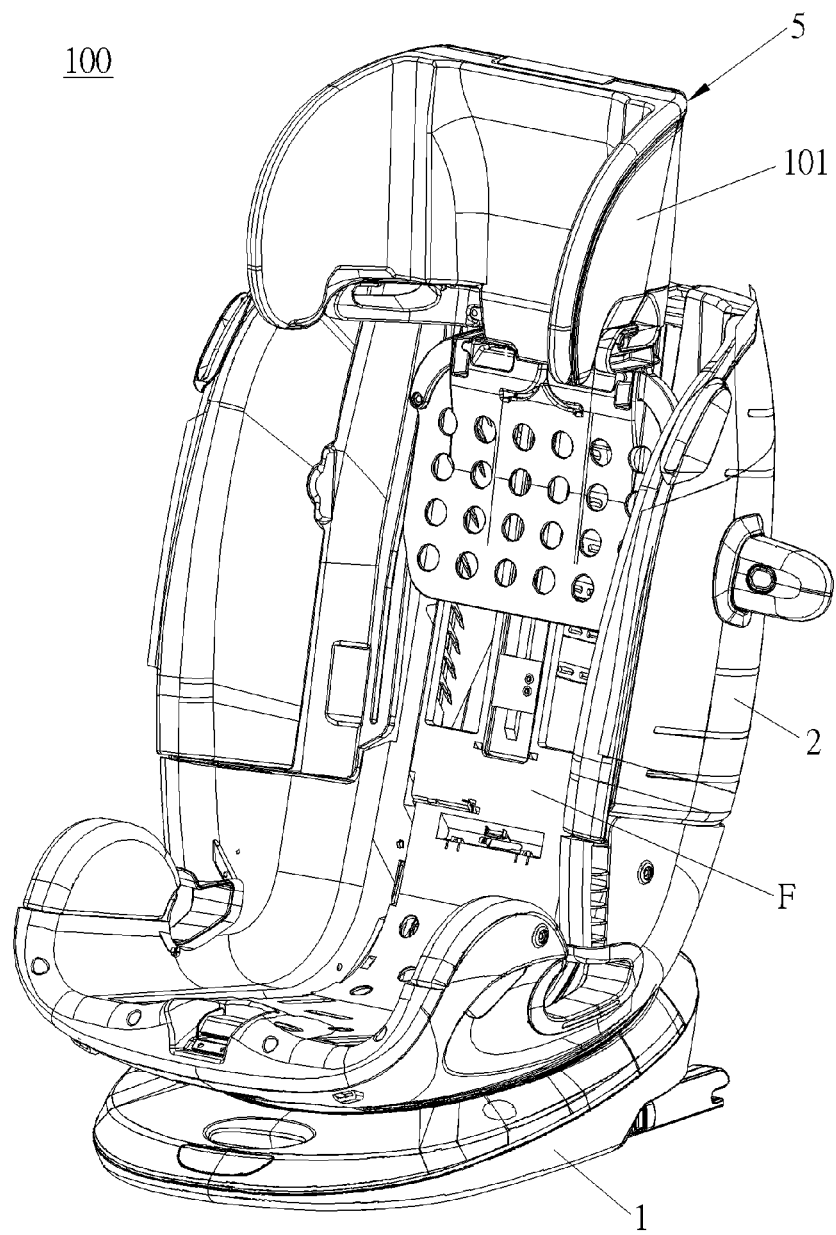
FIG. 9 is a diagram of a headrest of the seat misuse alarm device sliding upward to a higher position.
Figure 10:
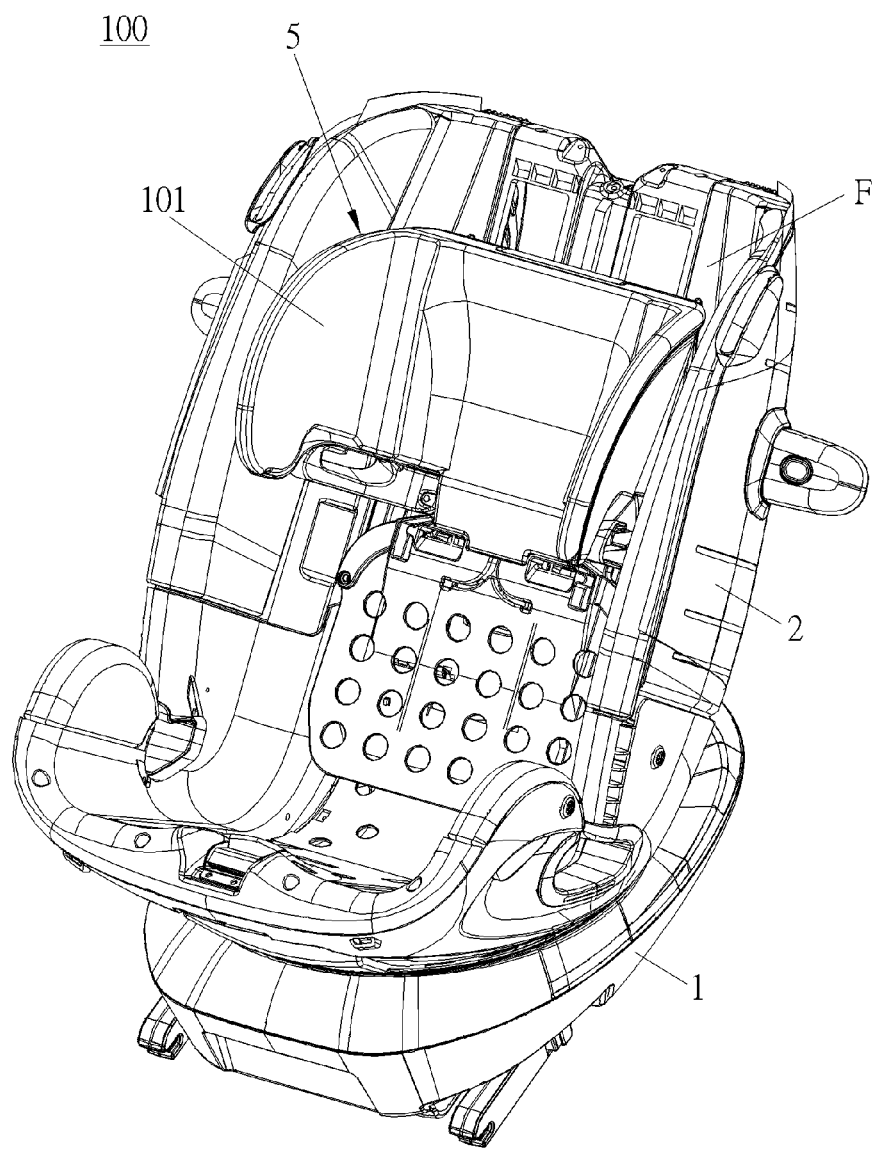
FIG. 10 is a diagram of the headrest of the seat misuse alarm device sliding downward to a lower position.
Figure 11:
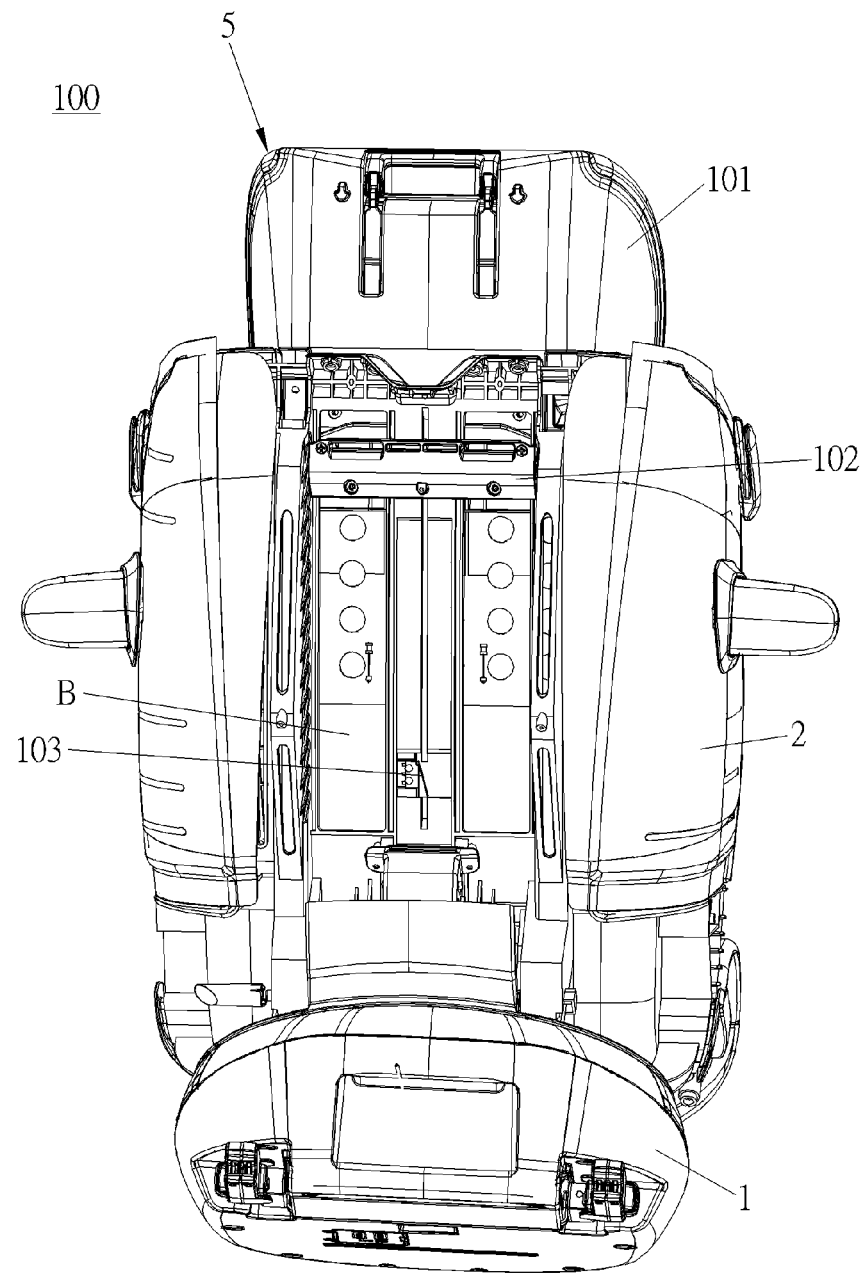
FIG. 11 is a back view of the seat misuse alarm device in FIG. 9.
Figure 12:
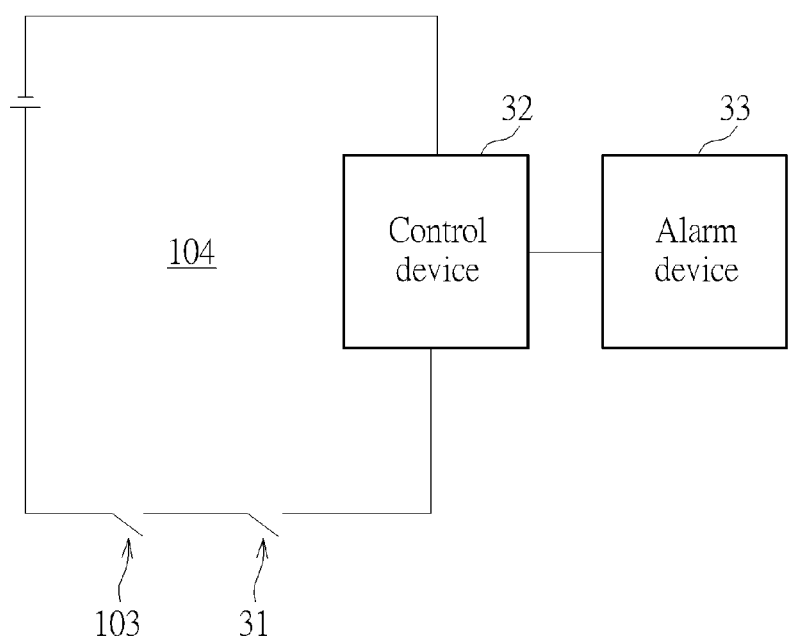
FIG. 12 is a circuit diagram of a headrest triggering switch in FIG. 11, a switch, a control device, and an alarm device.
Figure 13:
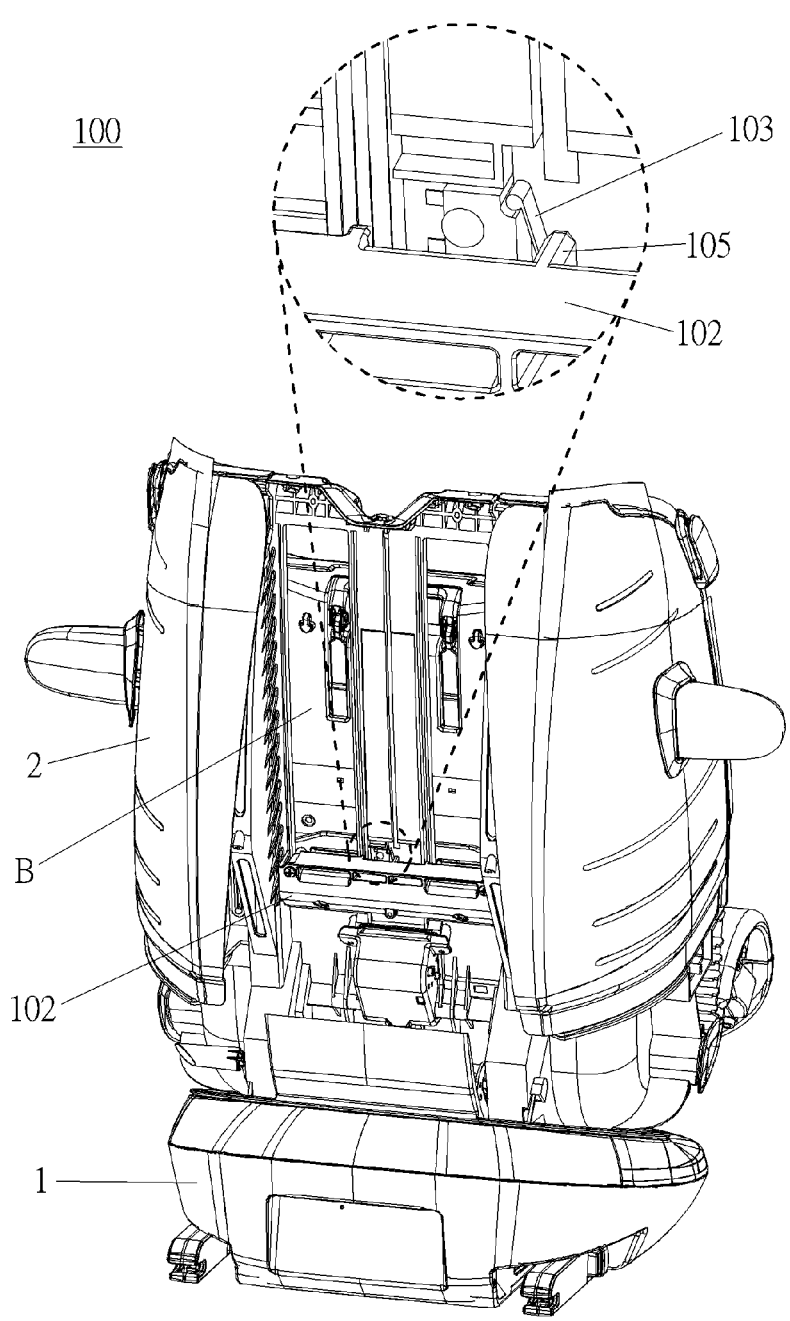
FIG. 13 is a diagram of a headrest fixing base in FIG. 11 sliding downward to the lower position.

Furthermore, please refer to FIG. 9, FIG. 10, and FIG. 11. FIG. 9 is a diagram of a headrest 101 of the seat misuse alarm device 100 sliding upward to a higher position. FIG. 10 is a diagram of the headrest 101 of the seat misuse alarm device 100 sliding downward to a lower position. FIG. 11 is a back view of the seat misuse alarm device 100 in FIG. 9. As shown in FIG. 9, FIG. 10, and FIG. 11, the seat misuse alarm device 100 could further include a headrest mechanism 5. The headrest mechanism 5 is movably disposed on the seat 2 and electrically connected to the alarm mechanism 3. Accordingly, when the seat 2 is located at the forward facing position relative to the base 1 for triggering the switch 31 to close, a height of the headrest mechanism 5 relative to the seat 2 can determine whether to conduct the alarm mechanism 3 for making the alarm mechanism 3 selectively send out the alarm or not. For example, the headrest mechanism 5 could include the headrest 101, a headrest fixing base 102, and a headrest triggering switch 103, but the present invention is not limited thereto. The headrest 101 is slidably disposed on a front side F of the seat 2 to be slidable between the higher position as shown in FIG. 9 and the lower position as shown in FIG. 10 relative to the seat 2, but the present invention is not limited thereto. The headrest 101 passes through the seat 2 to be connected to the headrest fixing base 102 located at a back side B of the seat 2, so that the headrest fixing base 102 can slide together with the headrest 101 relative to the seat 2. The headrest triggering switch 103 is disposed on the back side B of the seat 2 and is electrically connected to the alarm mechanism 3. To be more specific, as shown in FIG. 12, which is a circuit diagram of the headrest triggering switch 103 in FIG. 11, the switch 31, the control device 32, and the alarm device 33, the headrest triggering switch 103 can form an alarm circuit 104 cooperatively with the switch 31, the control device 32, and the alarm device 33. In addition, please refer to FIG. 13, which is a diagram of the headrest fixing base 102 in FIG. 11 sliding downward to the lower position. In practical application, as shown in FIG. 13, the headrest fixing base 102 has a driving rib 105 protruding therefrom corresponding to the headrest triggering switch 103 for pressing the headrest triggering switch 103 to close, but the present invention is not limited thereto.

As mentioned above, when the seat 2 rotates to the forward facing position relative to the base 1, the elastic returning member 42 drives the driving member 41 to be ejected out of the second hole 21 and then extend into the first hole 11 of the base 1 for triggering the switch 31 to close. At this time, via the aforesaid circuit design, if the user further slides the headrest 101 downward to the lower position (corresponding to a headrest position of a child from 0 to 15 months, which means the user has an intention to put the child from 0 to 15 months on the seat 2 at the forward facing position) as shown in FIG. 10 relative to the seat 2, the headrest fixing base 102 can slide synchronously to a position where the driving rib 105 presses the headrest triggering switch 103 to close (as shown in FIG. 13). In such a manner, via the two-stage conduction design that the driving member 41 presses the switch 31 to close and the headrest fixing base 102 presses the headrest triggering switch 103 to close, the alarm circuit 104 can be in a closed state such that the control device 32 can control the alarm device 33 to send out the alarm (e.g. light or sound). Accordingly, the seat misuse alarm device 100 can more precisely remind a user not to put a child from 0 to 15 months on the seat 2 located at the forward facing position.

On the other hand, if the seat 2 rotates to the forward facing position relative to the base 1 and the headrest 101 slides away from the lower position (e.g. sliding upward to the higher position (corresponding to a headrest position of a child above 15 months) as shown in FIG. 11, which means the user has no intention to put a child from 0 to 15 months on the seat 2 at the forward facing position), the alarm circuit 104 is in an open state since the headrest fixing base 102 is away from the headrest triggering switch 103 and fails to trigger the headrest triggering switch 103 to close. Therefore, the alarm device 33 does not send out the alarm.

Moreover, the present invention could adopt the circuit breaking design. To be brief, in this design, the headrest mechanism 5 could only include the headrest 101. The headrest 101 is electrically connected to the alarm mechanism 3 for cooperatively forming an alarm circuit, and the headrest 101 can break the alarm circuit (the related description for the circuit breaking design is commonly seen in the prior art and omitted herein) accordingly when the headrest 101 slides to the higher position (corresponding to a headrest position of a child above 15 months, which means the user has no intention to put a child from 0 to 15 months on the seat 2 at the forward facing position). In such a manner, no matter the seat 2 is located at the forward facing position or the rearward facing position, the alarm mechanism 3 does not send out the alarm, so as to prevent the user from unnecessary trouble in operating the seat 2.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A seat misuse alarm device comprising:
a base;
a seat having a forward facing position and a rearward facing position relative the base; characterized by:
an alarm mechanism having a switch; and
a switch triggering device triggering the switch to close for making the alarm mechanism send out an alarm when the seat is located at the forward facing position relative to the base,
wherein a first hole is formed at a side of the base, the switch is located in the first hole, a second hole is formed at a side of the seat, the switch triggering device is disposed through the second hole, and with rotation of the seat to the forward facing position relative to the base, the first hole is aligned with the second hole to make an end of the switch triggering device extend into the first hole and then trigger the switch to close.

2. The seat misuse alarm device of claim 1, wherein the seat is rotatably connected to the base.

3. The seat misuse alarm device of claim 1, wherein alarm mechanism is disposed on one of the base and the seat, and the switch triggering device is disposed on the other of the base and the seat.

4. The seat misuse alarm device of claim 3, wherein the alarm mechanism is disposed on the base, and the switch triggering device is disposed on the seat.

5. The seat misuse alarm device of claim 1, wherein the switch triggering device comprises a driving member and an elastic returning member, the driving member is slidably disposed in the second hole, and the elastic returning member is disposed between the driving member and the seat for providing an elastic force to make the driving member ejected from the second hole.

6. The seat misuse alarm device of claim 5, wherein a first limiting portion is formed on an inner wall of the second hole, a protrusion is formed on the driving member, and the elastic returning member is disposed between the first limiting portion and the protrusion.

7. The seat misuse alarm device of claim 6, wherein a fixing base is fixed to the inner wall of the second hole, and the first limiting portion protrudes from the fixing base.

8. The seat misuse alarm device of claim 7, wherein a second limiting portion is formed on the fixing base and is spaced apart from the first limiting portion, and the protrusion is located between the first limiting portion and the second limiting portion.

9. The seat misuse alarm device of claim 5, wherein the elastic returning member jackets the driving member.

10. The seat misuse alarm device of claim 1, wherein the alarm mechanism includes a control device and an alarm device, the switch, the control device, and the alarm device are electrically connected to each other and cooperatively form an alarm circuit, and when the switch is triggered to close, the control device controls the alarm device to send out the alarm.

11. The seat misuse alarm device of claim 10, wherein after an alarm time of the alarm device reaches to a predetermined value, the control device controls the alarm device to stop sending out the alarm.

12. The seat misuse alarm device of claim 1, wherein the seat misuse alarm device further comprises a headrest mechanism, the headrest mechanism is movably disposed on the seat and electrically connected to the alarm mechanism, and when the seat is located at the forward facing position relative to the base for triggering the switch to close, a height of the headrest mechanism relative to the seat determines whether to conduct the alarm mechanism for making the alarm mechanism selectively send out the alarm.

13. The seat misuse alarm device of claim 12, wherein the headrest mechanism comprises a headrest, a headrest fixing base, and a headrest triggering switch, the headrest is slidably disposed on a front side of the seat to be slidable between a higher position and a lower position relative to the seat, the headrest passes through the seat to be connected to the headrest fixing base located on a back side of the seat for making the headrest fixing base slidable together with the headrest, the headrest triggering switch is disposed on the back side of the seat and is electrically connected to the alarm mechanism, and the alarm mechanism sends out the alarm when the headrest slides to the lower position relative to the seat to make the headrest fixing base trigger the headrest triggering switch to close and the seat is located at the forward facing position relative to the base to trigger the switch to close.

14. The seat misuse alarm device of claim 13, wherein the headrest fixing base has a driving rib protruding therefrom corresponding to the headrest triggering switch, and the driving rib presses the headrest triggering switch to close when the headrest slides to the lower position relative to the seat.

15. The seat misuse alarm device of claim 13, wherein when the headrest slides away from the lower position relative to the seat to make the headrest fixing base not trigger the headrest triggering switch to close, the alarm device does not send out the alarm.

16. The seat misuse alarm device of claim 12, wherein the headrest mechanism comprises a headrest, the headrest is slidably disposed on a front side of the seat to be slidable between a higher position and a lower position, the headrest is electrically connected to the alarm mechanism for cooperatively forming an alarm circuit, and the headrest breaks the alarm circuit to make the alarm device not send out the alarm when the headrest slides to the higher position relative to the seat.

* * * * *